US012301597B1

United States Patent
Alhazmi et al.

(10) Patent No.: US 12,301,597 B1
(45) Date of Patent: May 13, 2025

(54) NETWORK EDGE DIGITAL TWIN FOR IOT ATTACK DETECTION

(71) Applicant: KING SAUD UNIVERSITY, Riyadh (SA)

(72) Inventors: Malak Mohammed Alhazmi, Riyadh (SA); Fatimah Yousef Alakeel, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/021,683

(22) Filed: Jan. 15, 2025

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01)

(58) Field of Classification Search
CPC ............................ H04L 63/1416; H04L 41/16
USPC ........................................................ 726/23
See application file for complete search history.

(56) References Cited

U.S. PATENT DOCUMENTS

| | | | | |
|---|---|---|---|---|
| 11,075,934 B1 * | 7/2021 | Aldhaheri | ............... | G06N 3/048 |
| 11,880,250 B2 * | 1/2024 | Engelberg | ................. | G06F 1/26 |
| 2018/0191756 A1 * | 7/2018 | Kaushik | ................. | H04L 63/145 |
| 2019/0356556 A1 | 11/2019 | Vicat-Blanc | | |
| 2021/0026342 A1 | 1/2021 | Duckheim et al. | | |
| 2022/0294715 A1 * | 9/2022 | Agrawal | ................. | H04L 43/04 |
| 2023/0026782 A1 * | 1/2023 | Sha | ....................... | H04L 67/1001 |
| 2023/0027152 A1 * | 1/2023 | Doshi | ................. | H04L 41/0672 |
| 2023/0095870 A1 * | 3/2023 | Du | ....................... | H04L 63/1425 |
| | | | | 726/23 |
| 2023/0164124 A1 | 5/2023 | Maher et al. | | |
| 2024/0080363 A1 | 3/2024 | Wang et al. | | |

* cited by examiner

Primary Examiner — Badri Narayanan Champakesan
(74) Attorney, Agent, or Firm — Nath, Goldberg & Meyer; Joshua B. Goldberg

(57) ABSTRACT

A system and method for detecting an attack on an Internet of Things (IoT) device connected to an edge of a local network includes: scanning the local network's edge to detect an IoT device connected to said local network edge, detecting the IoT device, running a digital twin of the detected IoT device, transmitting a copy of real-time data, directed to the detected IoT device, to the digital twin of the IoT device, transforming the copy of the real-time data transmitted to the digital twin of the IoT device into a format that a machine learning classification model can process, said transforming step producing transformed data, and classifying the transformed data to detect an attack on the IoT device. A computer connected to the edge of the same local network to which the IoT device is connected can be used to perform the method steps for detecting the attack.

17 Claims, 4 Drawing Sheets

NETWORK EDGE DIGITAL TWIN FOR IOT ATTACK DETECTION

TECHNICAL FIELD

The present disclosure relates to detecting an attack on an Internet of Things (IoT) device connected to the edge of a network, and more particularly, to a system and method for detecting an attack on an IoT device connected to a network's edge by using a digital twin of the IoT device.

DISCUSSION OF THE RELATED ART

The use of Internet of Things (IoT) devices, such as smart devices connected to the Internet, including surveillance cameras, smart appliances, etc., is rapidly increasing. Attackers, or hackers, are keen to use IoT devices' computational and communication capabilities to conduct attacks on different domains. Some of the widely conducted attacks are botnet DDoS and spoofing. IoT devices are enticing targets due to their large number, availability, design simplicity, and the fact that they operate mostly unattended. The consequences of these attacks expose the IoT data confidentiality, impact integrity, and render the IoT devices inoperable. Moreover, IoT device resources are significantly limited, making it complicated to install security solutions directly on the device to provide the required protection against attacks.

SUMMARY

The present disclosure relates to a system and method for addressing Internet of Things (IoT) attacks when an IoT device is connected to the edge of a network. The edge of the network may be, for example, a local home computer network, a local office computer network, etc., The local computer network includes a computer connected to a network switch or router, and an IoT device connected to the network switch or router. The network switch or router may be connected to the Internet.

The computer is configured to run (or emulate) a digital twin of the physical IoT device. The digital twin receives in real-time a copy of the same network traffic data that the physical IoT does. This can be accomplished, for example, by using port mirroring in the network switch or router. The copy of the real-time network traffic data received by the digital twin of the IoT device is analyzed by using the computer to determine whether it (the network traffic data) contains an attack on the physical IoT device.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Figure 1:
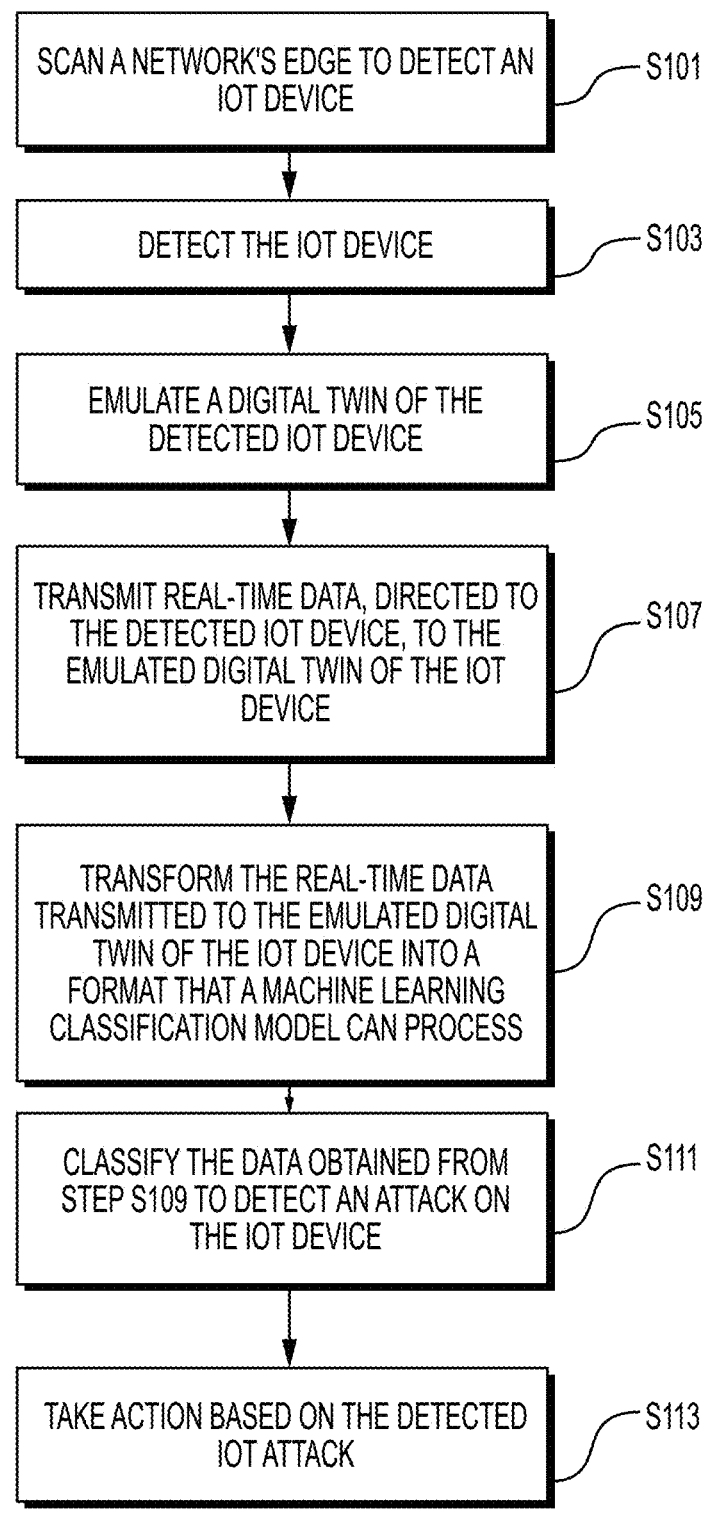
FIG. 1 is a flowchart illustrating a method for detecting an attack on an Internet of Things (IoT) device connected to a network's edge by using a digital twin of the IoT device according to an embodiment of the present disclosure.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Referring to FIG. 1, a method for detecting an attack on an Internet of Things (IoT) device connected to the edge of a network includes scanning the network's edge to detect an IoT device connected to said network edge (Step S101).

The network edge is the point where a device, including an IoT device, connects to the Internet. Generally speaking, the network's edge is close to the devices it is communicating with and is the entry point to the network. The edge of a network may include, for example, a home or office computer network. The home or office network (or another type of network) may be connected to the Internet via a modem. For example, IoT devices, computers, etc., can be communicatively coupled to one another via a network switch, a router, etc., to form the edge of a network (e.g., a local network). The router or network switch can be connected to the Internet via a modem.

Step S101 may include scanning the edge of a network, for example, scanning a local home computer network, scanning an office computer network, etc., for IoT devices connected to the network's edge.

IoT devices include hardware programmed to perform certain functions and can transmit data over the Internet through the edge of the network. Merely as non-limiting examples, IoT devices include surveillance cameras, smart TVs, smart locks, smart washing machines, smart thermostats, smart plugs, etc.

Step S103 includes detecting an IoT device when the IoT device is powered on and connected to the network's edge. Step S103 may also include identifying the IoT device detected, including, for example, determining the type, the manufacturer, the model number, serial number, etc. of the IoT device.

Step S105 includes running (or emulating) a digital twin of the IoT device detected in step S103. For example, a computer connected to the network edge may be used to emulate a digital twin of the detected IoT device. When the IoT device is detected for the first time in the network edge, Step S105 may include creating a digital twin (or a digital twin model) of the device detected in step S103, and then emulating (or running) the digital twin. In subsequent runs of the method of FIG. 1, when Step S103 detects the same IoT device for which a digital twin has already been created, step S105 includes emulating the digital twin for the IoT device detected in step S103. The digital twin, as the name implies, is configured to operate in the same or substantially the same way as its corresponding physical IoT device.

Step S107 includes transmitting real-time data, intended for (or directed to) the detected physical IoT device, to the emulated digital twin of the IoT device by using the network's edge. The data that is transmitted to the physical IoT device can be received from the Internet. For example, port mirroring of a network switch or router of the network's edge to which the physical IoT device is connected can be used to transmit (or mirror) to the digital twin, in real-time, a copy of the network traffic data addressed to the physical IoT device. Therefore, the physical IoT device receives the data addressed thereto, and the digital twin receives a copy of the same data as the physical IoT device, in real-time.

Step S109 includes transforming the real-time data transmitted to the emulated digital twin of the IoT device, received from step S107, into a format that a machine learning (ML) classification model can process. Step S109 may include normalizing the real-time data, extracting features from the normalized data, and mapping the extracted features to dataset fields. The data received from step S107, after being normalized, after its features have been extracted (subsequent to the normalization process), and after the extracted features have been mapped to dataset fields, may be tabulated, for example, and without limitation, in a spreadsheet (e.g., in a Microsoft Excel spreadsheet). Step S109 may include creating such a tabulation and/or storing the same in a database in a spreadsheet format or other suitable format.

Therefore, step S109 may be used to produce transformed data, said transformed data being usable by a ML classification model to determine whether the network's edge data, directed to the IoT device, includes an attack on the IoT device. The attack may be, for example, a cyberattack intended to exploit the physical IoT device connected to the network's edge, typically for a malicious purpose such as gaining access to data stored in the physical IoT device, gaining control of the physical IoT device, etc.

Step S111 includes using an ML classification model for analyzing the data obtained from step S109 to detect an attack on the IoT device of step S103.

Step S113 includes taking action based on the detected IoT attack. The action taken in step S113 may include, for example, sending an alert to a user (e.g., an administrator, owner, etc., of the IoT device or an entity overseeing the operation of the IoT device and/or the edge of the network to which the IoT device is connected) indicating that the IoT device detected in Step S103 has become the subject of a malicious attack, halting the data traffic between the physical IoT device and the Internet to interrupt communication between the actor behind the attack and the victim IoT device, etc. The alert may be sent as a text message, an email message, a telephone call, etc., to the user.

Step S113 may also include logging the details of a detected attack in a database. The details may include, for example, the device ID of the attacked IoT device, as detected in Step S103, the time the attack was detected, a copy of the data transmitted to the IoT device by the malicious actor, etc. The database may be included in the computer emulating the digital twin, in another computer connected to the edge of the network to which the IoT device is connected, or in the cloud.

When more than one IoT device is connected to the network's edge, the method of FIG. 1 may be performed for each connected IoT device.

Step S111 will be described in more detail below.

The performance of step S111 includes using an ML classification model for analyzing the transformed data obtained from step S109 to detect an attack on the IoT device of step S103. For example, step S111 may include using a trained (or built) Random Forest (RF) ML classification model for analyzing the data obtained from step S109 to detect an attack on the IoT device of step S103 (the terms "trained" and "built" may be used interchangeably for referring to an RF ML classification model that has been trained to detect the presence of IoT attack data at a network's edge). That is, the transformed data obtained from step S109 may be fed as input to a trained RF ML classification model, and the trained RF ML classification model may analyze the input data and determine, based on the analysis, whether the input data is indicative of an attack on the IoT device or whether the input data is indicative of benign network traffic directed toward the IoT device.

The RF ML classification model used in step S111 may be trained as described in this specification. Alternatively, the RF ML classification model used in step S111 may be trained based on other methods and may, for example, be obtained in a pre-trained and ready-to-use state for utilization in step S111.

When training an RF ML classification model, as described in this specification, the training process may be performed prior to carrying out step S111. Once the RF ML classification model has been trained as described in this specification, the trained RF ML classification model can be used in subsequent runs of the method of FIG. 1 for detecting an attack on an IoT device in step S111 (e.g., for detecting malicious traffic directed toward an IoT device).

A method of training an RF ML classification model, in accordance with an exemplary embodiment of the present subject matter, will be described below with reference to FIG. 2. However, and prior to describing a method of training an RF ML classification model for using the same in step S111, an explanation of the CICIoT2023 dataset will be provided below. This is because information from the CICIoT2023 dataset may be obtained and used for training the RF ML classification model.

The CICIoT2023 dataset may be used as input for training an RF ML classification model because the CICIoT2023 dataset includes a sizeable record of large-scale and known attacks in the IoT environment and was built using different types of physical (actual) IoT devices.

The CICIoT2023 dataset includes about 46,686,579 records of malicious and benign network traffic data directed to IoT devices and 46 features/aspects for each record.

The CICIoT2023 dataset includes 34 classes of data: 1 data class represents benign traffic, and the remaining 33 data classes represent network traffic containing attacks of various kinds on IoT devices. The 34 classes of data can be classified as being sub-classes of 8 main categories of data in the CICIoT2023 dataset. The 8 main categories of data include 1 benign network traffic data class and 7 primary attack network data classes, said 7 primary attack classes being: DDoS, DoS, Reconnaissance, Brute Force, Spoofing, Web Attacks, and Mirai.

Each record in the CICIoT2023 dataset represents an individual IoT packet transmitted to an IoT device within a network (e.g., within the edge of a network). The 46 features of each record in the CICIoT2023 dataset, as outlined in Table 1 below, are derived from IoT traffic data and serve as input variables for the RF ML classification model to detect potential attacks in step S111.

TABLE 1

Features/aspects and their description for each record in the CICIoT2023 dataset:

| # | Feature | Description |
|---|---------|-------------|
| 1 | Flow Duration | Duration of the packet's flow. |
| 2 | Header Length | The packet's header length. |
| 3 | Protocol Type | IP, UDP, TCP, IGMP, ICMP, Unknown (Integers). |
| 4 | Duration | Time-to-Live (TTL). |
| 5 | Rate | Rate of packet transmission in a flow. |
| 6 | Srate | Rate of outbound packet transmission in a flow. |
| 7 | Drate | Rate of inbound packet transmission in a flow. |
| 8 | fin flag number | Fin flag value. |
| 9 | syn flag number | Syn flag value. |
| 10 | rst flag number | rst flag value. |
| 11 | psh flag number | psh flag value. |
| 12 | ack flag number | ack flag value. |
| 13 | ece flag number | ece flag value. |
| 14 | cwr flag number | cwr flag value. |
| 15 | ack count | The number of packets with the ack flag is set in the same flow. |
| 16 | syn count | The number of packets with syn flags is set in the same flow. |
| 17 | fin count | The number of packets with fin flags is set in the same flow. |
| 18 | urg count | The number of packets with the urg flag is set in the same flow. |
| 19 | rst count | The number of packets with the rst flag is set in the same flow. |
| 20 | HTTP | Indicates if the application layer protocol is HTTP. |
| 21 | HTTPS | Indicates if the application layer protocol is HTTPS. |
| 22 | DNS | Indicates if the application layer protocol is DNS. |
| 23 | Telnet | Indicates if the application layer protocol is Telnet. |
| 24 | SMTP | Indicates if the application layer protocol is SMTP. |
| 25 | SSH | Indicates if the application layer protocol is SSH. |
| 26 | IRC | Indicates if the application layer protocol is IRC. |
| 27 | TCP | Indicates if the transport layer protocol is TCP. |
| 28 | UDP | Indicates if the transport layer protocol is UDP. |
| 29 | DHCP | Indicates if the application layer protocol is DHCP. |
| 30 | ARP | Indicates if the link layer protocol is ARP. |
| 31 | ICMP | Indicates if the network layer protocol is ICMP. |
| 32 | IPv | Indicates if the network layer protocol is IP. |
| 33 | LLC | Indicates if the link layer protocol is LLC. |
| 34 | Tot sum | Summation of packet lengths in flow. |
| 35 | Min | The minimum packet length in the flow. |
| 36 | Max | Maximum packet length in the flow. |
| 37 | AVG | The average packet length in the flow. |
| 38 | Std | The standard deviation of packet length in the flow. |
| 39 | Tot size | Packet's length. |
| 40 | IAT | "Inter-packet Arrival Time": the time difference with the previous packet. |
| 41 | Number | The number of packets in the flow. |

TABLE 1-continued

Features/aspects and their description for each record in the CICIoT2023 dataset:

| # | Feature | Description |
|---|---------|-------------|
| 42 | Magnitude | (Average of the lengths of incoming packets in the flow + average of the lengths of outgoing packets in the flow)$^{0.5}$. |
| 43 | Radius | (Variance of the lengths of incoming packets in the flow + variance of the lengths of outgoing packets in the flow)$^{0.5}$. |
| 44 | Covariance | Covariance of the lengths of incoming and outgoing packets. |
| 45 | Variance | (Variance of the lengths of incoming packets in the flow/variance of the lengths of outgoing packets in the flow). |
| 46 | Weight | (Number of incoming packets × Number of outgoing packets). |

Figure 2:
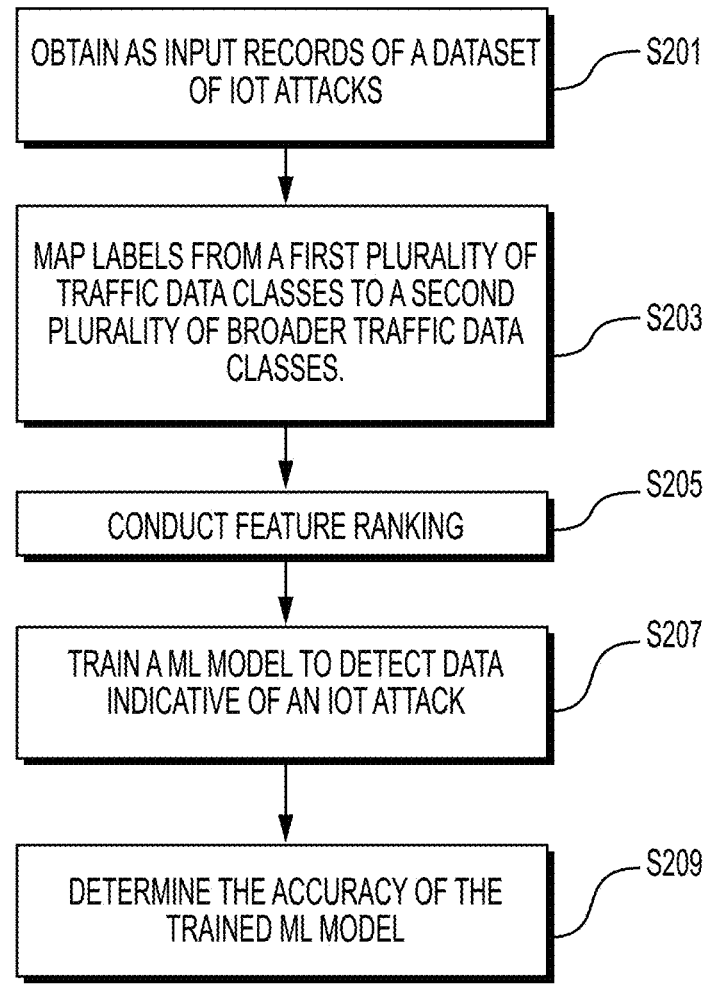
FIG. 2 is a flowchart illustrating sub-steps included in the steps of the method of FIG. 1.

Referring to FIG. 2, according to step S201, the training of the RF ML classification model includes obtaining as input at least a sample of data records included in a dataset containing records of IoT attacks. The at least a sample of data records of a dataset obtained in step S201 may also include records of benign data traffic data directed to an IoT device. Alternatively, step S201 may include obtaining as input all of the data records included in the dataset.

In a non-limiting example, step S201 includes obtaining 46,515 records from the CICIoT2023 dataset. Step S201 may also include cleaning the captured data, for example, correcting spelling mistakes contained in the 46,515 records. This process may also be referred to as normalizing the captured data.

Step S203 includes mapping labels from a first plurality of traffic data classes to a second plurality of broader traffic data classes. The second plurality of broader traffic data classes is smaller than the first plurality of traffic data classes.

For example, step S203 includes mapping labels from 34 traffic data classes contained in the CICIoT2023 dataset to 8 broader traffic data classes, the 8 broader traffic data classes including 1 benign traffic data class and 7 attack traffic data classes. The 7 attack traffic data classes are: DDoS, DoS, Reconnaissance, Brute Force, Spoofing, Web Attacks, and Mirai.

Step S205 may include conducting feature importance ranking to identify and eliminate features with minimal impact and/or no impact on data classification. Step S205 may include determining features of the IoT traffic data flowing through a network's edge that have minimal impact or no impact on IoT attack detection. The features determined to have a minimal and/or no impact on IoT attack detection can be excluded from the records obtained from the dataset in step S201.

The process of determining which features have a minimal impact and/or no impact on IoT attack detection can be carried out, for example, by using an RF ML classification model. The step of determining which features have minimal and/or no impact on IoT attack traffic can be performed prior to the step of training the RF ML model to detect malicious IoT traffic. For example, the "feature importance" function of an RF ML model can be used to determine the features with minimal impact and/or no impact on IoT attack detection.

In the example, above, the 46,515 records of the CICIoT2023 dataset, received in step S201 and mapped in step S203, can be split into training data and testing data in step S205. In the example provided in this specification, step S205 includes splitting the received and mapped data into 70% training data and 30% testing data.

Step S205 may then include feeding the 70% training data (as mapped by step S203) to the RF ML model as input to determine features with minimal and/or no impact on detecting IoT attacks.

Figure 3:
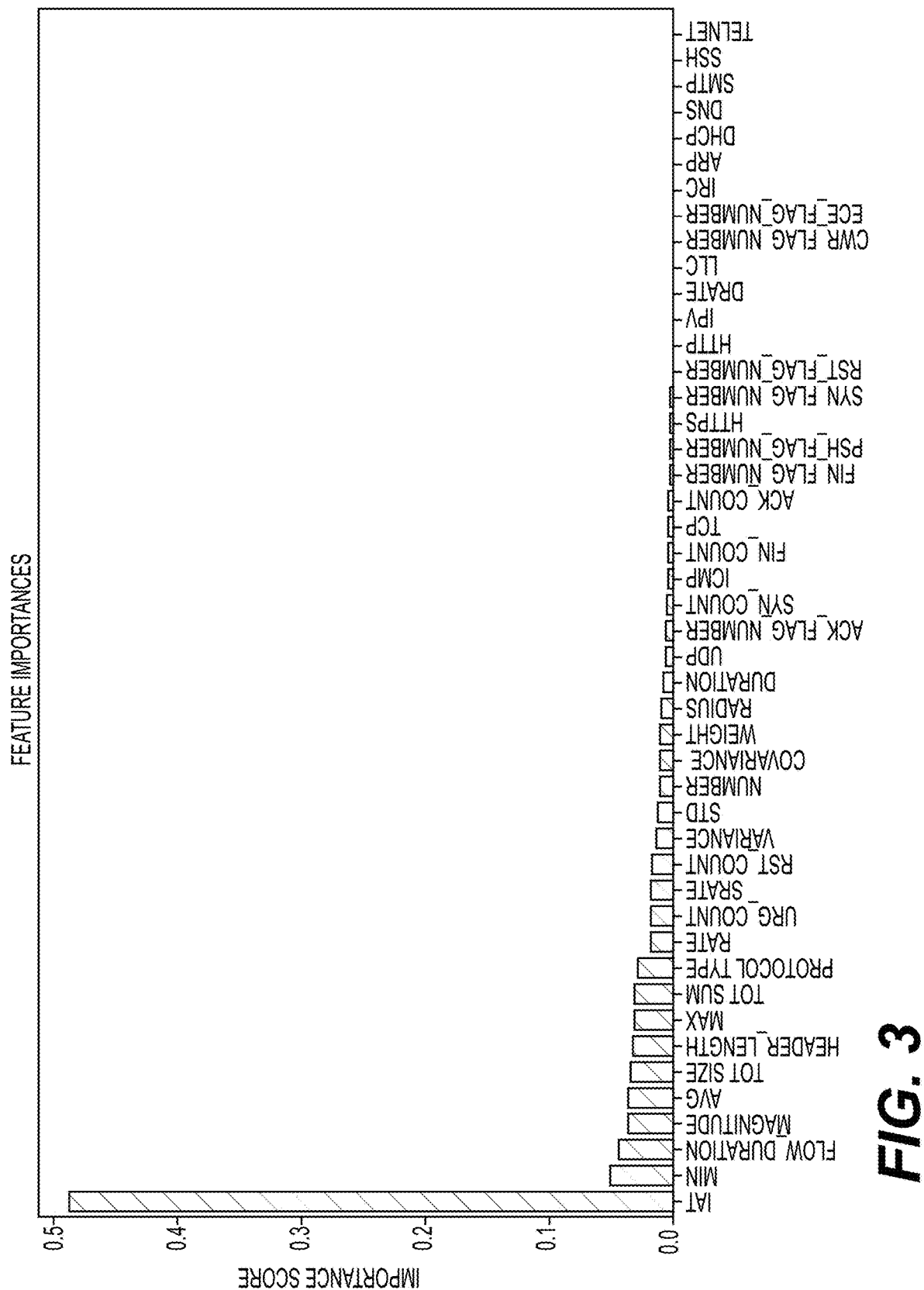
FIG. 3 is a chart illustrating feature ranking of IoT network data.

FIG. 3 illustrates the result of the RF ML model feature important ranking process based on the example described in this specification.

Step S205 may also include analyzing the results of the RF ML model ranking to determine which features to exclude from the data mapped in step S203 (i.e., features with minimal and/or no impact on detecting IoT attacks, as indicated above).

Referring to FIG. 3, and concerning the example described in this specification, the "IAT" feature of the data mapped in step S203 is determined in step S205 to hold the highest-ranking importance, with a score of 0.485123. This score indicates that the "IAT" feature significantly contributes to the RF ML classification model for detecting in IoT attack in edge network data.

Referring to FIG. 3, and following the "IAT" feature, the "Min" and "Magnitude" features of the data received from step S203, as ranked in step S205, also exhibit notable importance for the classification model, with scores of 0.052985 and 0.042983, respectively. With reference to FIG. 3, other features such as "flow_duration," "Header_Length," and "Max" demonstrate moderate importance in the ranking.

Notably, and with reference to FIG. 3, several features received a score of zero in the importance ranking of step S205, suggesting a minimal impact or no impact on the RF ML classification model. Ranking the features of the IoT traffic data according to the method of FIG. 2, as illustrated in FIG. 3, provides valuable insights into determining which features are important for usage in determining IoT attacks and which features are less important, and therefore, may be excluded from being used to determining IoT attacks.

Based on the ranking results of FIG. 3, it may be assumed that following IoT traffic features have minimal or no impact on attack detection, and thus can be removed during classification: rst flag number, HTTP, IPv, Drate, LLC, cwr flag number, ece flag number, IRC, ARP, DHCP, DNS, SMTP, SSH, and Telnet. The exclusion of these features from data classification (for determining IoT traffic attacks) can reduce bandwidth usage and computation power usage while still enabling a ML model to classify IoT traffic data as attack data and benign data with a high confidence level.

The features indicated above can be removed from the training data, which represents 70% of the data mapped in step S203 in the example provided in this specification.

Step S207 includes training an RF ML model to detect data indicative of an IoT attack. More specifically, step S07 may include training an RF ML model to detect data indicative of an IoT attack by inputting the data with features removed therefrom, as indicated in step S205, as training data in the RF ML classification model. Therefore, step S207 produces a trained RF ML classification model.

Step S207 may include, for example, obtaining an RF ML classification model in a state that is not trained for detecting IoT attacks in a network's edge. The untrained RF ML classification model can then be trained by using as input the data with features removed therefrom, as indicated in step S205. In an approach, the untrained RF ML classification model can be trained by using as input the data as received from step S203 (the mapping step) without removing features from said data as indicated in step S205.

In the example provided in this specification, the 70% training data indicated above, with its lesser important features (and/or unimportant features) removed, can be used to train an RF ML model to detect IoT attacks at the edge of a network.

In the example described in this specification, by training an RF ML classification model to detect data indicative of an attack on an IoT device connected to the edge of a network by using the 70% training data with its lesser important and/or unimportant features removed, as indicated above, the trained (or built) RF ML classification model resulting from step S207 was used on the 30% testing data of step S205. That is, the trained RF ML classification model fed as input the 30% testing data of step S205. In this example, according to step S209 the trained RF ML classification model produced accuracy, precision, and recall matrix scores of 99.305%, 99.324%, and 99.304%, respectively. Stated otherwise, the trained RF ML classification model detected with 99.3% accuracy IoT attacks contained in the 30% input testing data. 99.3% is a high detection accuracy rate.

Step S109 will be described in more detail below. Step S109 is described above as including the process of normalizing the real-time data received from step S107, extracting features from the normalized data to produce extracted features, and mapping the extracted features to dataset fields.

The normalization of data is performed according to its customary meaning in the field. Merely as an example, the normalization of data includes converting text such as "Mister SMITH", as received from step S107, into "Mr. Smith". This step may also include correcting spelling errors.

The extraction of features from the normalized data may include extracting information indicative of (or corresponding to) the 46 features of the dataset described above with reference to Table 1 (e.g., the 46 features of a network data packet as included in the CICIoT2023 dataset).

The mapping of the extracted features to dataset fields in step S109 may include mapping (or associating) the extracted information to its corresponding feature, from among the 46 features of the dataset. As an example, the mapping step may include mapping (or associating) the value indicative of the duration of a packet's flow, as obtained from the extraction process to the "Flow Duration" feature, as illustrated in Table 1 (i.e., feature no. 1 in Table 1).

Notably, when using an RF ML classification model as taught in this specification, the same features that are excluded from consideration during the training of the RF ML classification model (based on the ranking of step S205) may also be excluded from the process of mapping the extracted features to dataset fields of step S109. The exclusion of this information from the real-time stream of information obtained via step S107 significantly reduces bandwidth usage and computational resources while producing highly accurate attack detection results.

Table 2 below includes two examples of edge network data flow to an IoT device, with Example 1 representing a DDoS attack launched on an IoT device connected to the network's edge and Example 2 representing benign traffic directed to the IoT device. Example 1 represents attack IoT data on the IoT device determined by using the teachings of this specification, and Example 2 represents benign traffic to the IoT device, determined by using the teachings of this specification.

TABLE 2

| | | | Example1: Attack (DDoS) | | | Example2: No attack (Benign) | | |
|---|---|---|---|---|---|---|---|---|
| Feature# | Rank# | Feature | Pkt1 | Pkt2 | Pkt3 | Pkt1 | Pkt2 | Pkt3 |
| 40 | 1 | IAT | 83098626.52 | 83331739.9 | 83089855.86 | 0.000506306 | 0.008507895 | 166518756.3 |
| 35 | 2 | Min | 50 | 54 | 54 | 210.8 | 364.6 | 66 |
| 1 | 3 | Flow Duration | 0.09502001 | 0 | 0.040245469 | 1.764408588 | 29.37914727 | 0.7479774 |
| 42 | 4 | Magnitude | 11.13947668 | 10.39230485 | 10.41615079 | 45.92881946 | 44.7711638 | 15.42820063 |
| 37 | 5 | AVG | 64.21809808 | 54 | 54.24930501 | 1067.820635 | 1061.604524 | 120.6052529 |
| 39 | 6 | Tot size | 73.96 | 54 | 54.16 | 1369.2 | 509.4 | 162.6 |
| 2 | 7 | Header Length | 3713.6 | 54 | 55.28 | 232749.2 | 986077.4 | 17585.7 |
| 36 | 8 | Max | 107.92 | 54 | 55.02 | 2093.2 | 2817.2 | 506 |
| 34 | 9 | Tot sum | 720.94 | 567 | 569.58 | 6010.2 | 4489.4 | 1894.2 |
| 3 | 10 | Protocol Type | 16.78 | 6 | 5.88 | 6 | 6 | 8.2 |
| 5 | 11 | Rate | 11960.627 | 0.834543041 | 73.25888592 | 114.2011984 | 53.5957528 | 39.61624187 |
| 18 | 12 | urg count | 0.06 | 1 | 0 | 11.1 | 174 | 6 |
| 6 | 13 | Srate | 11960.627 | 0.834543041 | 73.25888592 | 114.2011984 | 53.5957528 | 39.61624187 |
| 19 | 14 | rst count | 0.15 | 1 | 0.03 | 200.5 | 1231.5 | 26.6 |
| 45 | 15 | Variance | 0.36 | 0 | 0.17 | 0.9 | 0.9 | 1 |
| 38 | 16 | Std | 20.19089279 | 0 | 0.403308577 | 740.9783383 | 922.6294333 | 127.1999108 |
| 41 | 17 | Number | 9.5 | 9.5 | 9.5 | 5.5 | 5.5 | 13.5 |
| 44 | 18 | Covariance | 1226.457635 | 0 | 0.972868482 | 653993.3238 | 962282.7601 | 15961.97401 |
| 46 | 19 | Weight | 141.55 | 141.55 | 141.55 | 244.6 | 38.5 | 38.5 |
| 43 | 20 | Radius | 28.57458703 | 0 | 0.570950546 | 1047.901615 | 1304.795058 | 178.3452832 |
| 4 | 21 | Duration | 65.2 | 64 | 64.4 | 114.4 | 164.4 | 65.7 |

TABLE 2-continued

| | | | Example1: Attack (DDoS) | | | Example2: No attack (Benign) | | |
|---|---|---|---|---|---|---|---|---|
| Feature# | Rank# | Feature | Pkt1 | Pkt2 | Pkt3 | Pkt1 | Pkt2 | Pkt3 |
| 28 | 22 | UDP | 1 | 0 | 0 | 0 | 0 | 0 |
| 12 | 23 | ack flag number | 0 | 1 | 0 | 0 | 0 | 0 |
| 16 | 24 | syn count | 0.01 | 0 | 1.02 | 2 | 1.6 | 1.5 |
| 31 | 25 | ICMP | 0 | 0 | 0 | 0 | 0 | 0 |
| 17 | 26 | fin count | 0 | 0 | 0 | 0 | 0 | 0 |
| 27 | 27 | TCP | 0 | 1 | 1 | 1 | 1 | 1 |
| 15 | 28 | ack count | 0 | 0 | 0 | 0 | 0 | 0.5 |
| 8 | 29 | fin flag number | 0 | 0 | 0 | 0 | 0 | 0 |
| 11 | 30 | psh flag number | 0 | 1 | 0 | 0 | 0 | 0 |
| 21 | 31 | HTTPS | 0 | 0 | 0 | 1 | 1 | 0 |
| 9 | 32 | syn flag number | 0 | 0 | 1 | 0 | 0 | 0 |

As indicated in Table 2, the edge network data directed to an IoT device was normalized, extracted, and mapped to dataset fields of a table that includes only 32 features out of the 46 total features of a data packet (as illustrated in Table 1). This is because the remaining 14 features of the dataset (as illustrated in Table 1), were deemed as being of lesser importance or of no importance when performing the method of FIG. 2 (in training the RF ML classification model) and were therefore excluded from consideration during said training process. For this reason, the same features were excluded from the real-time data processed in step S109. In addition, and as illustrated in Table 2, the features of the network data of step S109 were ranked according to the ranking of the importance of features as described above with reference to step S205. Refer to the Rank #1 row in Table 2, indicating that the "IAT" feature is the most important (or first ranked) feature of the packet, as described in this specification with reference to FIG. 3.

Referring to Table 2, in a DDoS attack scenario, as illustrated in Example 1, the packets' inter-arrival time (IAT) is typically significantly high due to the high packet rate and the attack's disregard for packet loss, network congestion, or response timing from the target system. By contrast, benign traffic, as shown in Example 2, may exhibit either low IAT values, indicating normal, non-DDoS conditions, or high values in certain states, which might superficially resemble DDoS traffic. When high IAT values are observed, further analysis of other features can help distinguish benign traffic from potential attack traffic.

Other features like "Number" and "Weight" can be highly useful in this analysis since they show a pattern that distinguishes DDoS from benign traffic (see Table 2).

In summary, the RF ML classification model of the present disclosure is trained and tested by using the most impactful features in a dataset, achieving high matrix scores. Then, the trained RF ML model is used on new data, captured in real-time from the network traffic, normalized, and transferred into a data format that the trained RF ML model can process to detect potential attacks.

Figure 4:
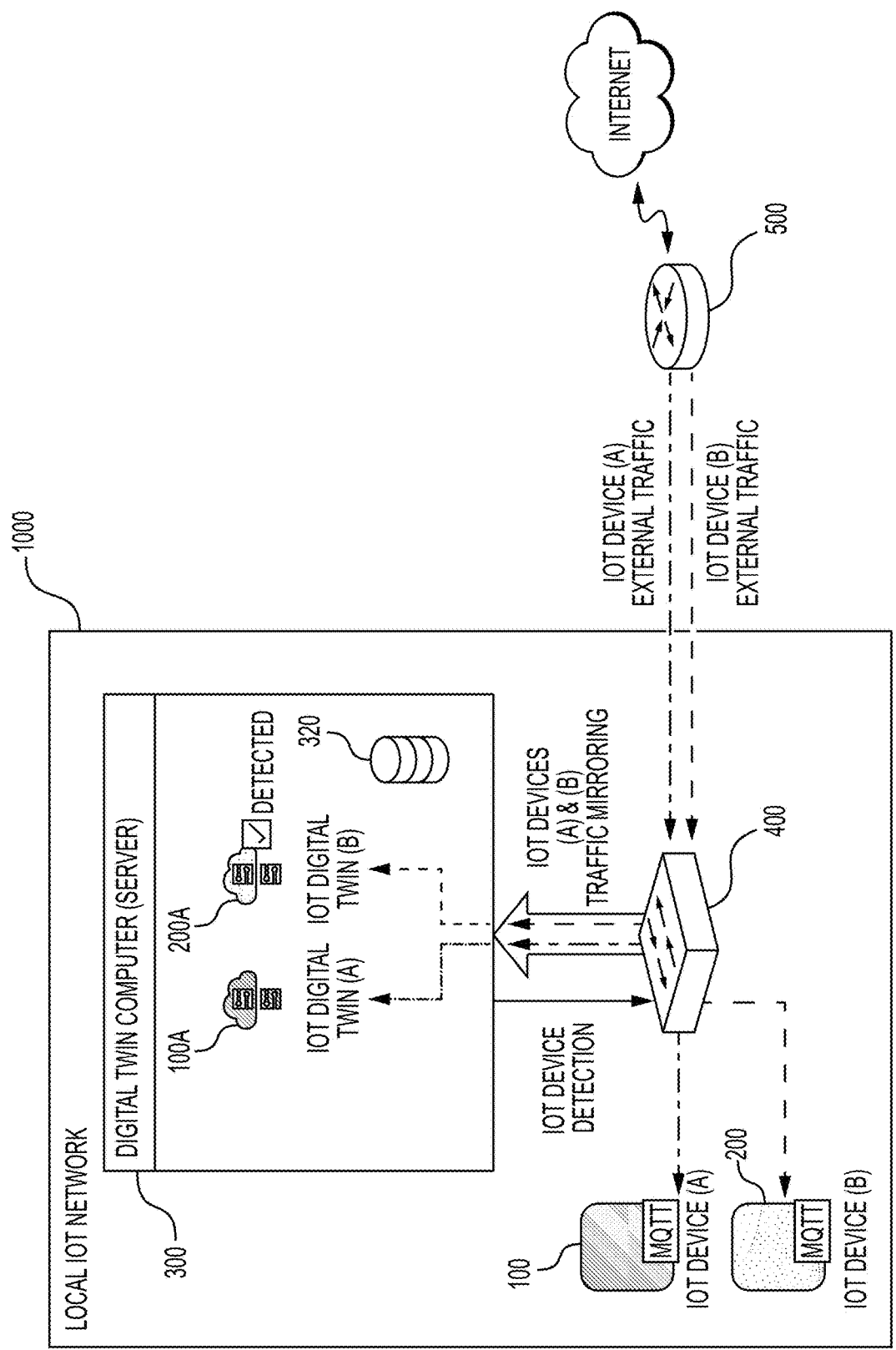
FIG. 4 is a diagram illustrating a system for detecting an attack on an IoT device connected to a network's edge.

FIG. 4 is a diagram illustrating a system for detecting an attack on an IoT device connected to the edge of a local network.

Referring to FIG. 4, the system includes an IoT network 1000. The IoT network 1000 may be a local network, for example, a local home network, a local office network, etc.

The local IoT network 1000 may include a first (physical) IoT device 100, a second (physical) IoT device 200, a computer 300 and a network switch 400. The network switch 400 may be communicatively connected to a router 500, and the router 500 may be communicatively connected to the Internet.

The network switch 400 may be include a first port communicatively connecting the network switch 400 with the first IoT device 100 by wire, a second port communicatively connecting the network switch 400 with the second IoT device 200 by wire, and a third port communicatively connecting the network switch 400 with the computer 300.

The third port may be a single port that is configured to mirror the network traffic, directed to each one of the first and second IoT devices 100, 200, to the computer 300. This configuration enables a copy of real-time data, directed to the first and second IoT devices 100, 200, to be directed (or transmitted) to the computer 300.

The computer 300 may be a personal computer (PC), a server, etc. The computer 300 includes a processor and a non-transitory, tangible, program storage medium, readable by the computer system, embodying a program of instructions executable by the processor to perform method steps for detecting an attack on an the IoT device. More specifically, the program of instructions embodies instructions for performing the method steps of the method for detecting an IoT attack as described in this specification with reference to FIGS. 1-3.

For example, and in an attempt to reduce repetition of the method steps described with reference to FIGS. 1-3, the method steps include using the computer 300 to scan the local network's edge (e.g., the local IoT network 1000) to detect the first IoT device 100, using the computer 300 to run a digital twin 100A of the first detected IoT device 100, transmitting a copy of real-time data, directed to the first IoT device 100, to the digital twin 100A by using the port mirroring of the network switch 400 or router 500, transforming the copy of the real-time data transmitted to the digital twin 100A into a format that a machine learning classification model can process, said transforming step producing transformed data, and using the computer 300 to run a machine learning (ML) classification model to classify the transformed data to detect an attack on the first IoT device 100.

While only a limited number of steps of the method of FIGS. 1-3 is described in detail with reference to FIG. 4 to avoid repetition of information, it is understood that the computer 300 of the local IoT network 1000 may be configured to perform all of the method steps for detecting an attack on an IoT device, as described in detail in this specification with reference to FIG. 1-3.

The same steps delineated above for the IoT device 100 may be performed for the second IoT device 200, with the computer 300 being configured to run a digital twin 200A of the second IoT device 200.

In the embodiment of FIG. 4, the network switch 400 is connected to the first and second IoT devices 100, 200 by wire. However, the present subject matter is not limited to this configuration. In an embodiment, the network switch 400 may be omitted. In this configuration, the first and second IoT devices 100, 200, and the computer 300 can be connected to the router 500 by wire, or wirelessly. In the case of wireless connection, wireless port mirroring of the router 500 can be used to transmit to the computer 300, in real-time, a copy of network data addressed to the first and second IoT devices 100, 200.

The IoT network 1000 may include a database 320 configured to store transformed data therein. The database 320 is communicatively coupled to the computer 300. As illustrated in FIG. 4, the database 320 may be included in the computer 300.

The computer 300 can be used to transmit an alert to a user, the alert being indicative of an attack being detected on any one of the first and second IoT devices 100, 200.

The IoT network 1000 of FIG. 4 is shown to have two IoT devices. However, this configuration is merely exemplary. The IoT network 1000 may be modified to include more than two IoT devices, or a single IoT device, as needed. The method steps described in this specification can be performed for any and all of the IoT devices connected to the IoT network 1000.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A method for detecting an attack on an Internet of Things (IoT) device connected to an edge of a local network, the method comprising:
    scanning the local network's edge to detect an IoT device connected to said local network edge;
    detecting the IoT device;
    running a digital twin of the detected IoT device;
    transmitting a copy of real-time data, directed to the detected IoT device received from the Internet, to the digital twin of the IoT device;
    transforming the copy of the real-time data transmitted to the digital twin of the IoT device into a format that a machine learning classification model can process, said transforming step producing transformed data; and
    classifying the transformed data to detect an attack on the IoT device, wherein the classifying of the transformed data to detect an attack on the IoT device includes a process of using a trained Random Forest (RF) machine learning (ML) classification model, and wherein the transformed data is fed to the RF ML classification model as input;
    wherein the process of producing the trained RF ML classification model includes: obtaining as input at least a sample of data records included in a dataset containing records of IoT attacks, mapping labels from a first plurality of traffic data classes contained in the dataset to a second plurality of broader traffic data classes, wherein the second plurality of broader traffic data classes is smaller than the first plurality of traffic data classes.

2. The method of claim 1, further comprising transmitting an alert to a user, the alert being indicative of the detected attack on the IoT device.

3. The method of claim 1, wherein the transforming of the copy of the real-time data to produce the transformed data includes:
    ranking features of the copy of the real-time data in an order of importance for detecting the attack on the IoT device,
    determining one or more features of the real-time data as being of low importance or of no importance for detecting the attack on the IoT device, and
    excluding from the transformed data the one or more features of the real-time data determined as being of low importance or of no importance for detecting the attack on the IoT device.

4. The method of claim 3, wherein, prior to the ranking of features of the copy of the real-time data, the method further comprises:
    normalizing the copy of the real-time data prior to produce normalized data,
    extracting features of IoT traffic data from the normalized data to produce extracted features, and
    mapping the extracted features to dataset fields.

5. The method of claim 4, wherein the dataset fields include entries for a first number of features of each packet of the IoT traffic data prior to the ranking of features of the real-time data.

6. The method of claim 5, wherein the first number of features is 46.

7. The method of claim 5, wherein the dataset fields include entries for a second number of features of each packet of the IoT traffic data after the exclusion of the features determined as being of low importance or of no importance for detecting an attack on the IoT device,
    wherein the second number of features is smaller than the first number of features.

8. The method of claim 1,
    obtaining an untrained RF ML classification model, and
    training the untrained RF ML classification model by using the labels from the plurality of traffic data classes, mapped to the second plurality of broader traffic data classes, as input training data to produce the trained RF ML classification model.

9. The method of claim 8, wherein the training of the untrained RF ML classification model further includes:
    ranking features of the plurality of traffic data classes, mapped to the second plurality of broader traffic data classes, in an order of importance for detecting the attack on the IoT device to produce ranked features,
    determining one or more features, from among the ranked features, as being of low importance or of no importance for detecting the attack on the IoT device, and
    excluding the one or more features determined as being of low importance or of no importance for detecting the attack on the IoT device from the input training data that is used to produce the trained RF ML classification model.

10. The method of claim 8, wherein the dataset containing records of IoT attacks is a CICIoT2023 dataset.

11. A system for detecting an attack on an Internet of Things (IoT) device connected to an edge of a local network, the system comprising: an IoT device; a network switch or a router communicatively connected to the IoT device; and a computer communicatively connected to the network switch or router via port mirroring such that the computer can receive a copy of data traffic directed to the IoT device via the network switch or router, the computer comprising a processor and a non-transitory, tangible, program storage medium, readable by the computer system, embodying a program of instructions executable by the processor to perform method steps for detecting an attack on the IoT device, the method comprising:

using the computer to scan the local network's edge to detect the IoT device;
 using the computer to run a digital twin of the detected IoT device;
 transmitting a copy of real-time data, directed to the detected IoT device, to the digital twin of the IoT device by using the port mirroring of the network switch or router;
 transforming the copy of the real-time data transmitted to the digital twin of the IoT device into a format that a machine learning classification model can process, said transforming step producing transformed data; and
 using the computer to run a machine learning (ML) classification model to classify the transformed data to detect an attack on the IoT device, wherein the classifying of the transformed data to detect an attack on the IoT device includes a process of using a trained Random Forest (RF) machine learning (ML) classification model, and wherein the transformed data is fed to the RF ML classification model as input;
 wherein the process of producing the trained RF ML classification model includes: obtaining as input at least a sample of data records included in a dataset containing records of IoT attacks, mapping labels from a first plurality of traffic data classes contained in the dataset to a second plurality of broader traffic data classes, wherein the second plurality of broader traffic data classes is smaller than the first plurality of traffic data classes.

12. The system of claim 11, wherein the network switch or router is a network switch, and the network switch is connected to the IoT device and the computer by wire.

13. The system of claim 11, wherein the network switch or router is a router, and the router is connected to the IoT device and the computer wirelessly.

14. The system of claim 11, wherein the network switch or router is connected to the Internet.

15. The system of claim 11, further comprising a database configured to store the transformed data therein, wherein the database is communicatively coupled to the computer.

16. The system of claim 11, wherein the method further comprises using the computer to transmit an alert to a user, the alert being indicative of the detection of an attack on the IoT device.

17. The system of claim 11, wherein the transforming of the copy of the real-time data to produce the transformed data includes:

ranking features of the copy of the real-time data in an order of importance for detecting the attack on the IoT device,
 determining one or more features of the real-time data as being of low importance or of no importance for detecting the attack on the IoT device, and
 excluding from the transformed data the one or more features of the real-time data determined as being of low importance or of no importance for detecting the attack on the IoT device.

* * * * *